(12) United States Patent
Biswas et al.

(10) Patent No.: US 8,755,370 B1
(45) Date of Patent: Jun. 17, 2014

(54) MECHANISMS FOR SESSION BORDER CONTROL OF VOIP COMMUNICATION FROM NON-SYMMETRIC PORT ADDRESS TRANSLATION DEVICE

(75) Inventors: Kaushik P. Biswas, San Jose, CA (US); Vinay Jayant Pande, Sunnyvale, CA (US); Jayesh Chokshi, Cupertino, CA (US); Tuan Q. Le, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1774 days.

(21) Appl. No.: 11/864,520

(22) Filed: Sep. 28, 2007

(51) Int. Cl.
*H04L 12/66* (2006.01)
*H04L 12/28* (2006.01)

(52) U.S. Cl.
USPC ........... 370/352; 370/389; 370/392; 709/227; 726/11; 726/12

(58) Field of Classification Search
USPC ........ 370/352, 389, 392; 709/227; 726/11–14
See application file for complete search history.

(56) References Cited

U.S. PATENT DOCUMENTS

| | | | | |
|---|---|---|---|---|
| 7,346,044 B1* | 3/2008 | Chou et al. | ..................... | 370/352 |
| 7,940,654 B2* | 5/2011 | March et al. | .................. | 370/229 |
| 2003/0007486 A1* | 1/2003 | March et al. | .................. | 370/389 |
| 2003/0007497 A1* | 1/2003 | March et al. | .................. | 370/410 |
| 2003/0043740 A1* | 3/2003 | March et al. | .................. | 370/229 |
| 2007/0053289 A1* | 3/2007 | March et al. | .................. | 370/229 |
| 2007/0192508 A1* | 8/2007 | Sollee | ........................... | 709/245 |

OTHER PUBLICATIONS

Cisco PIX Firewall and VPN Configuration Guide, 2002, Version 6.2.*
"Asterisk behind a Cisco PIX 515E firewall using fixup protocol—Asterisk.org Issue Tracker" (hereinafter as Stevedavies et al.) issues. asterisk.org Message Board, Jun. 28, 2005 through Jul. 11, 2007.*

* cited by examiner

*Primary Examiner* — Nicholas Jensen
(74) *Attorney, Agent, or Firm* — Haynes and Boone, LLP

(57) ABSTRACT

In one embodiment, a device comprises an input port for receiving network packets that are being communicated via a computer network. A processor is in communication with the input port. The processor is configured to facilitate dynamic monitoring and updating of port addresses assigned by at least one non-ALG PAT router so as to facilitate communication of packets that are exchanged between an inside user agent and an outside user agent in a manner that mitigates a likelihood of communication interruption during a VOIP session. An output port is in communication with the processor for transmitting packets via the computer network.

15 Claims, 4 Drawing Sheets

MECHANISMS FOR SESSION BORDER CONTROL OF VOIP COMMUNICATION FROM NON-SYMMETRIC PORT ADDRESS TRANSLATION DEVICE

TECHNICAL FIELD

The present disclosure relates generally to methods and apparatus for processing session data within a computer network.

BACKGROUND

Session Border Controllers (SBCs) are becoming increasingly popular for facilitating devices on either side of the Session Border Controllers so that the devices remain unaware of each others' existence. Specifically, in Session Initiation Protocol (SIP) deployments, inside user-agents (UAs) are configured with the SBC's inside-address as its proxy/registrar address and directs all signaling traffic to the SBC, which in turn ensures that this traffic reaches the actual proxy/registrar (as configured in its database) and vice-versa. SBCs facilitate consolidating the SIP Application Level Gateway (ALG) fixups to be done at a common point of the network, rather than doing the fixups at each intermediate home gateway (gateways front-ending the UAs). Since the ALG fixups are performed at an SBC, non-ALG intermediate home gateways may be used, in other words intermediate home gateways that cannot perform the ALG fixups. Such intermediate home gateways may fix up the L3 and L4 headers without performing ALG fixups.

Non-ALG intermediate home gateways may perform port address translation (PAT) in a non-symmetric fashion. In non-symmetric PAT, if the inside UA or phone sends a packet with, for example, a User Datagram Protocol (UDP) src-port: 1024, then the PAT at the intermediate home gateway will not ensure that 1024 will be preserved post-intermediate home gateway. When this occurs, a packet from outside the intermediate home gateway may be destined for a different port, and the PAT will not let it through to the inside UA or phone. This problem may also occur with symmetric intermediate home-gateways that support more than one UA in the inside-domain, and therefore may not ensure preservation of the same src-port post-PAT.

DESCRIPTION

Overview

In one embodiment, a device comprises an input port for receiving network packets that are being communicated via a computer network. A processor is in communication with the input port. The processor is configured to facilitate dynamic monitoring and updating of port addresses assigned by at least one non-ALG PAT router so as to facilitate communication of packets that are exchanged between an inside user agent and an outside user agent in a manner that mitigates a likelihood of communication interruption during a VOIP session. An output port is in communication with the processor for transmitting packets via the computer network.

Description of Example Embodiments

Figure 1:
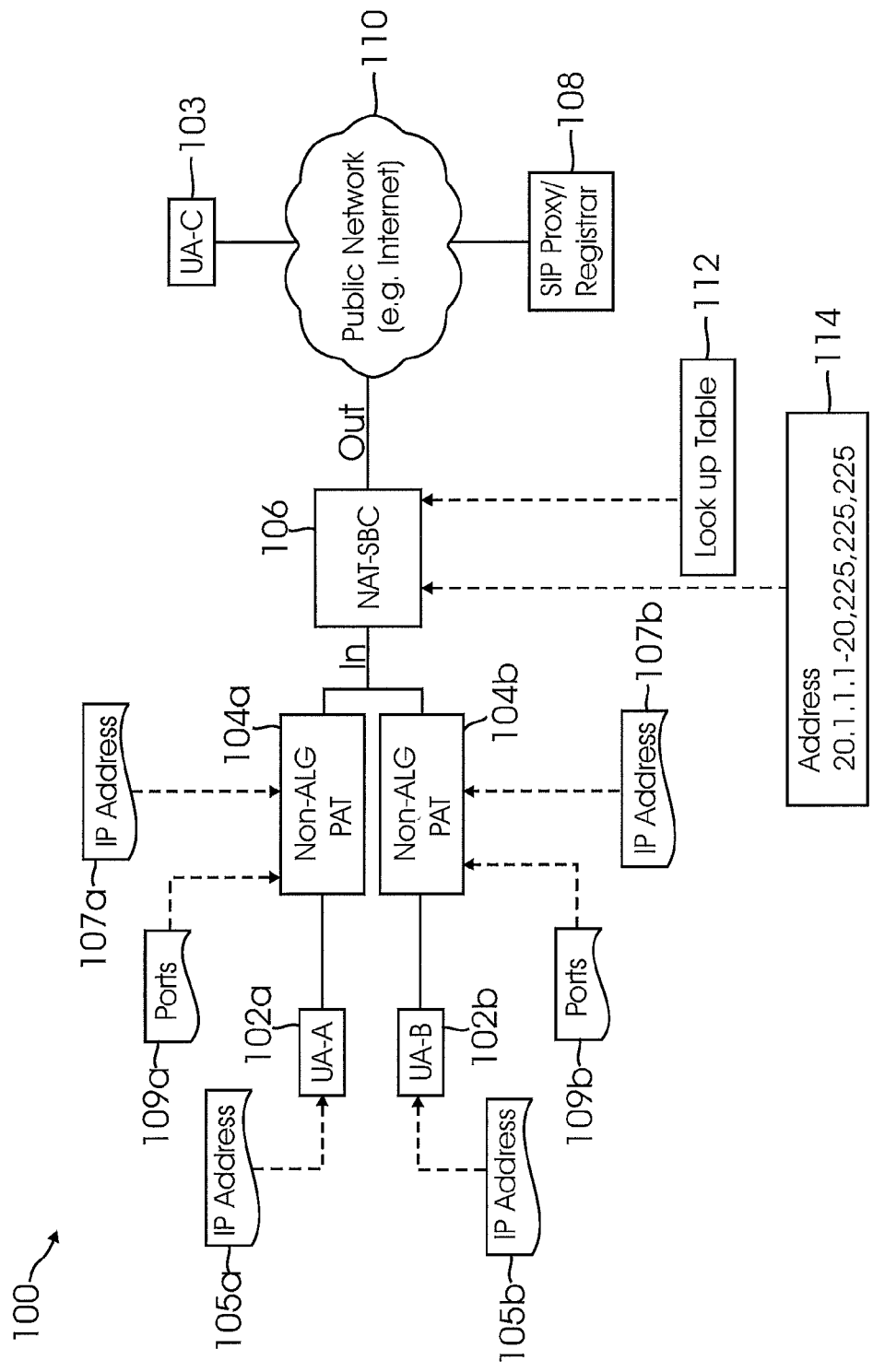
FIG. 1 illustrates an example embodiment of a computer network.

FIG. 1 illustrates an example embodiment of a network 100 in which example embodiments of the present disclosure may be implemented. The network may include a router 104, a session border controller (SBC) 106 and a public network 110. The router 104 may couple one or more user agents (UA) 102 to the SBC 106 for communicating via Voice Over Internet Protocol (VOIP) with an outside user agent 103 that is also connected to the public network 110.

Inside UAs 102 (UA-A 102a and UA-B 102b) may each be configured to send session data to the SBC 106 through their respective, individual non-application level gateway routers 104 (Non-ALG PAT 104a and Non-ALG PAT 104b).

The inside User Agents 102 may be telephones, for example telephones configured to communicate over a Voice Over Internet Protocol (VOIP). UAs A and B may be pre-configured, for example from the factory, with unique source IP addresses 105a and 105b, respectively.

In an example embodiment, routers 104 may be non-application level gateway (Non-ALG) devices. Each router 104a and 104b may be assigned a unique IP address 107a, 107b, respectively, by an Internet Service Provider (ISP) and may include a plurality of port addresses 109a 109b, respectively, to facilitate multiplexing. The routers 104a and 104b may not be NAT capable and may not include mechanisms for analyzing and translating embedded addresses. Packets sent to or from the Non-ALG PAT routers 104 may therefore have a unique, pre-assigned source or destination IP address, respectively, yet may be configured to communicate with the UA 102 over a given range of port addresses 109.

The routers 104 may be configured to communicate through the SBC 106. The inside UAs 102 may therefore be coupled to the inside of the SBC 106. Other outside user agents 103 (UA-C) may be coupled with the outside interface of the SBC 106, for example, via one or more local networks(s) and public networks 110 (e.g., the Internet). An SIP Proxy or Registrar 108 may also be coupled with the public network 110 although any suitable registrar device for managing sessions may be utilized, depending on the particular call signaling protocol.

The SBC 106 may be a NAT capable NAT-SBC configured to dynamically monitor and update the port addresses 109 assigned by a Non-ALG PAT routers 104 to communication packets exchanged between an inside UA 102 and an outside UA 103 to ensure uninterrupted communication during a VOIP session. Dynamically monitoring the port is described below, with respect to figures. Dynamically monitoring may include saving information relative to a communication, and fixing up communication packets to ensure proper routing of communication packets between user agents through a NAT-SBC 106. The SBC 106 may be configured to translate addresses in the header, as well as the payload, based on a proxy binding 112 and a public address pool 114. The proxy binding includes an Internal Proxy address A1 assigned to the NAT-SBC and an External Proxy address A2 assigned to a proxy or registrar device 108. The NAT-SBC is configured to serve as a proxy for the actual proxy or Registrar 108. Accordingly, session data from each phone is typically directed to the SBC's address and then the SBC forwards such session data to the actual proxy or registrar device 108 after the session data is processed as explained further below.

The SBC 106 may have its own domain in the range, for example, from 20.1.1.1 through 20.255.255.255. Thus, the SBC may also be configured to translate public addresses generated by each Non-ALG PAT router 104 into public addresses from its public address pool 114 having a range between 20.1.1.1 and 20.255.255.255. In the event of a communication from a UA through a Non-ALG PAT, the NAT-SBC may assign an address and port to the communication from its public address pool 114. The SBC may map the address assigned for a communication to the address and port pair (sbc info) assigned by a Non-ALG PAT router 104, saving the information in a lookup table 112 associated with SBC 106. The SBC 106 may also map the UA contact information to the assigned router address, saving the information in the lookup table 112.

In general, the NAT-SBC 106 may be configured to translate the header and payload of session packets so as to not terminate and generate each session. The SBC 106 may translate the appropriate addresses in the packet and then forward the translated packet towards its destination. An address translation as discussed herein may include translation of an IP address and/or a port value. The SBC may also be configured to translate the contact information in an SIP payload. Inbound communications may then be translated and forwarded in accordance with the information saved in the lookup table.

The translations generally do not affect other portions of the packet and, therefore, most of the packet information is maintained upon forwarding. Since the translated and forwarded packet retains most of its information, security and other information may also be reliably maintained. This translation and forwarding scheme may be accomplished in any suitable manner.

Figure 2:
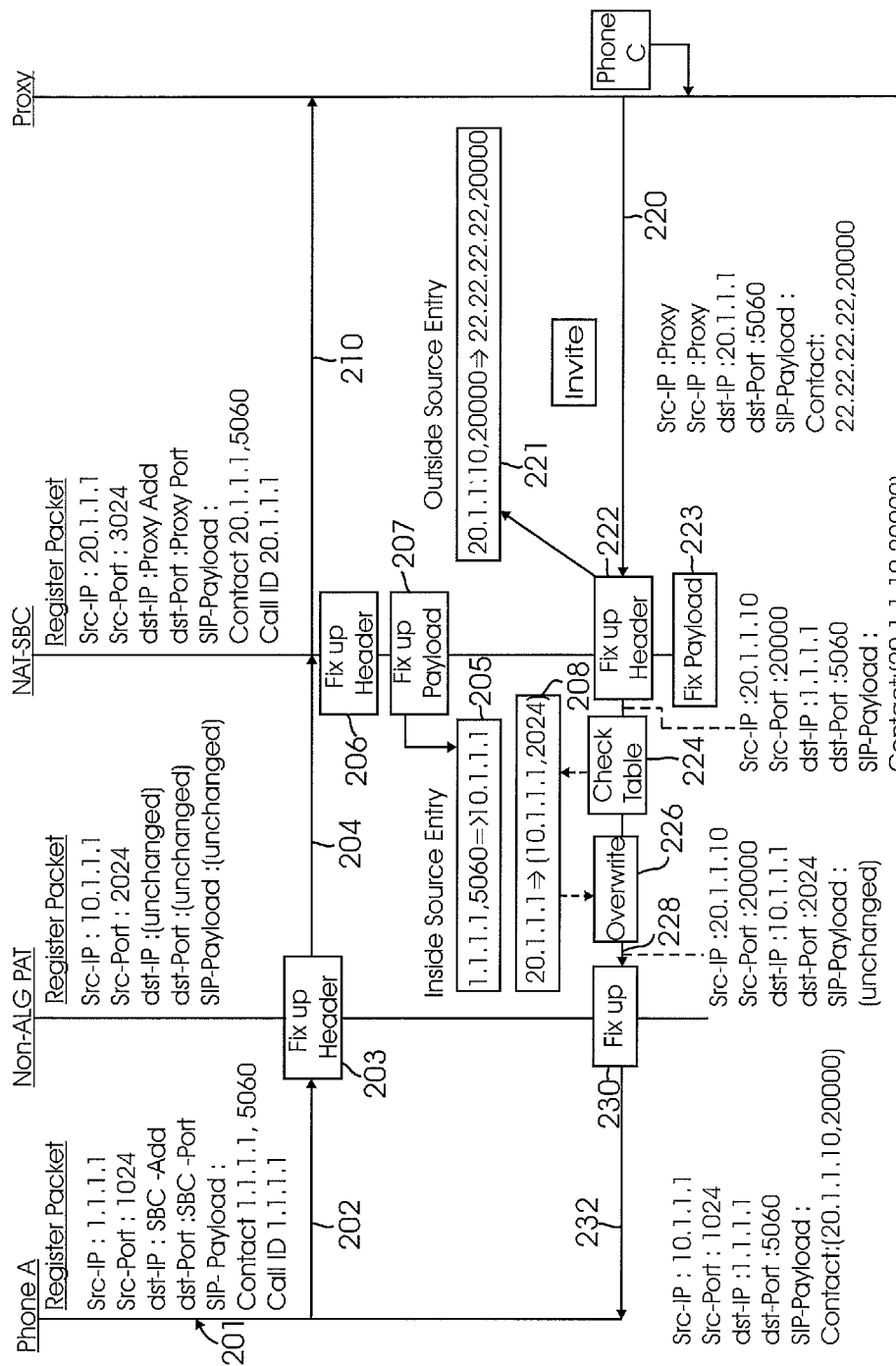
FIG. 2 illustrates an example embodiment of a method of communicating between two user agents.

FIG. 2 illustrates an example method 200 of VOIP communication. The method 200 may include registering 201 an inside user agent with a proxy. A user agent, for example a phone, may send 202 an SIP REGISTER packet to a router, for example a non-ALG PAT device. The SIP REGISTER packet may have a source address and port, a destination address port and a payload, including contact information and a call ID. The phone may have been preconfigured to communicate with an SBC so that the destination address and port are the pre-configured SBC address and port. The phone may have a unique IP address, so that the source address and port are the phone's IP address and port.

In an example embodiment, the non-ALG PAT device may fix up 203 the SIP Register packet, for example only the L3 and L4 headers, and forward the fixed-up packet to a NAT-SBC. The non-ALG PAT device may translate the source address and port to its unique IP address and an assigned port, assigned from its range of available ports. The destination address and port and the SIP payload may remain unchanged. The non-ALG PAT device may create an entry in a PAT table and forward 204 the fixed-up register packet to the SBC.

In an example embodiment, the SBC may fix up the header 206, changing the source address and port from those assigned by the non-ALG PAT device to an address and port assigned from the SBC's address pool and available ports. The SBC may also create an inside source entry, mapping the assigned address to the incoming non-ALG PAT address/port pair and saving the SBC-information in a lookup table, thereby opening up a signaling pinhole 208 across the SBC.

In an example embodiment, the SBC may also fix up the contact and call-id information of the SIP payload 207. The contact information may change the user agent's address to the SBC assigned address, while leaving the original port unchanged. The call-id may be changed from the user agent's address to the SBC assigned address. The SBC may then map the assigned address to the user agent's address and port and save the information 208 in the look up table.

The SBC may then forward 210 the fixed-up packet to the proxy. The proxy registers the user agent according the contact information in the SIP payload. In the example embodiment shown in FIG. 2, the proxy knows Phone A as (20.1.1.1, 5060).

In an example embodiment, an outside user agent, for example a Phone C, may initiate a call with Phone A by sending an invite signal 220. The invite signal may include a header and an SIP payload including media information for Phone C. The header may have a source address and port corresponding to the proxy's address and port and may have a destination address and port corresponding to the media information received by the proxy for Phone A, for example 20.1.1.1, 5060 in the example embodiment of FIG. 2.

In an example embodiment, the SBC handles the packet by fixing up the header 222 and fixing up the payload 223. In an example embodiment, the SBC compares the destination port in the incoming packet to the look up table. Since the destination port (5060) matches a port saved in the inside source entry 205 as described above, the SBC translates the header's destination address and port to 1.1.1.1, 5060. The SBC may also fix up the contact information in the SIP payload, translating the information from the Phone C's address and port to the assigned address and port. In the example of FIG. 2, the payload contact information for Phone C is changed from 22.22.22.22, 20000 to 20.1.1.10, 20000. This contact information will remain unchanged so that Phone A will know Phone C as 20.1.1.10. The SBC may also create an outside source entry 221, mapping the assigned address/port to Phone C's original contact information and saving the information in the lookup table.

The SBC may then check the lookup table 224 to see whether there is an entry for the user agent or Phone A. For example, the SBC may check the Non-ALG PAT address stored 205 in the inside source entry as described above because it is mapped to the port 5060 corresponding to the incoming invite packet header and used to fix up the header 224 as discussed above.

In the event there is an entry for Phone A, the SBC then checks the lookup table to find the correct destination address and port for forwarding the Invite packet to Phone A. The SBC then overwrites 226 the destination address and port of the Invite packet with the pinhole which had been saved 208 in the lookup table during registration as discussed above. The SBC then forwards the Invite packet to the non-ALG PAT 228.

In an example embodiment, the non-ALG PAT fixes up the packet header 230, translating the source address and port and the destination address and port in accordance with a pinhole opened when fixing up the header 203 during registration 210. The non-ALG PAT then forwards the packet to the user agent or Phone A. Phone A thus knows Phone C according to the contact information in the SIP payload which remained unchanged since the payload was fixed up 223 as described above. In this example embodiment, Phone A knows Phone C as 20.1.1.10, 20000.

Figure 3:
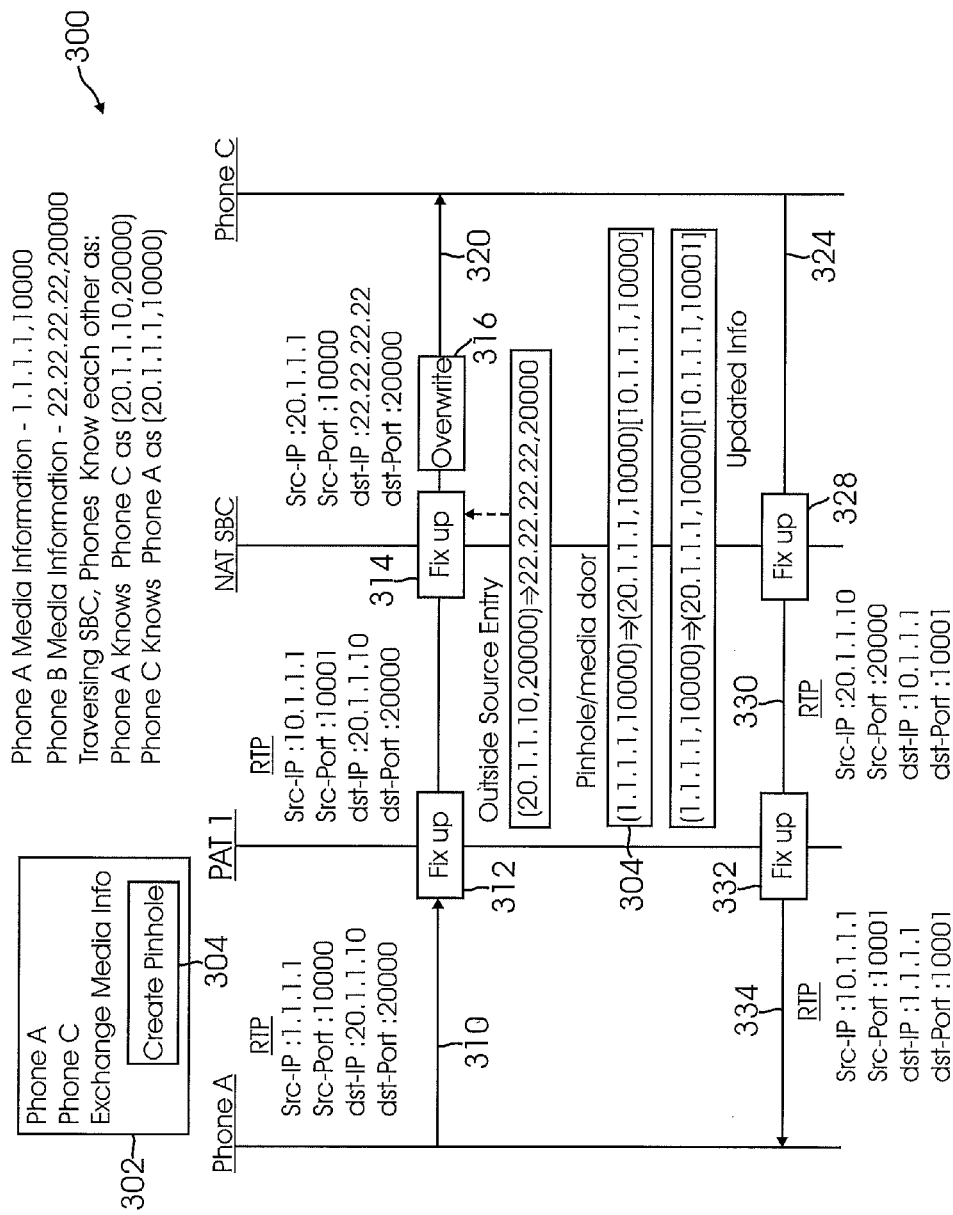
FIG. 3 illustrates an example embodiment of a method of communicating between two user agents.

FIG. 3 illustrates an example embodiment of a method 300 of exchanging media by a user agent via a non-ALG PAT router and an SBC. In an example embodiment, Phone A and Phone C exchange media information 302. In an example embodiment, an inside user agent and an outside user agent, for example Phone A and Phone C, may exchange their media information in accordance with the session description protocol (SDP). In an example embodiment, user agents, for example phones, that support both symmetric and early media may send real-time transport protocol (RTP) data using the same port number they advertised as their media information in the SDP. Phone A may have media information, for example, (1.1.1.1, 10000) and Phone C may have media information, for example, (22.22.22.22, 20000). Traversing a NAT-SBC, Phone A may know Phone C as (20.1.1.10, 20000) and Phone C may know Phone A as 20.1.1.1, 10000).

In an example embodiment, the NAT SBC may create a media pinhole or media door 304 when Phone A's media information traverses the SBC. For example, the SBC may map the SIP payload's source media information from Phone A to the assigned SBC source address and port and save the information in the look up table. This information may be saved with a corresponding incoming source address and port received from the PAT. In an example embodiment, the pinhole/media door may be (1.1.1.1, 10000)→(20.1.1.1, 10000) [10.1.1.1, 10000].

In an example embodiment, Phone A may send RTP 310. The RTP header may have a source address and port of 1.1.1.1, 10000. The destination address and port may be 20.1.1.10, 20000, as received from the NAT-SBC when exchanging media information. The RTP may then traverse a non-ALG PAT. In the case of an non-symmetric PAT, the L3, L4 headers may be fixed up 312 so that the source address is 10.1.1.1, namely the PAT's IP address, and the address is dynamically changed to a different port, for example 10001. The destination address and port, however, may remain the same. The PAT may create a pinhole and map the fixed up source address and port to the received source address and port, saving the information in a look up table.

In an example embodiment, the RTP may traverse a NAT-SBC. The NAT-SBC may perform fix ups 314 on the packet, for example translating the source address and port to 20.1.1.1, 10001 and the destination address and port to 22.22.22.22, 20000. The NAT-SBC may fix up the destination address and port based on information stored in a look up table when the Phone C's media information traversed the NAT-SBC when the outside source entry was created 221 as discussed above, with respect to FIG. 2. The NAT-SBC may then modify or overwrite 316 the existing pinhole or media door to update the dynamically changed port as follows: (1.1.1.1, 10000)→(20.1.1.1, 10000) [20.1.1.1, 10001].

In an example embodiment, the NAT-SBC forwards the RTP packet 320 to Phone C with destination address and port 22.22.22.22, 20000, as discussed above. Since Phone C is listening on 22.22.22.22, 20000, the RTP may be correctly processed at Phone C.

In an example embodiment, Phone C may send an RTP 324 to Phone A with a destination address and port of 20.1.1.1, 10000, as during SDP exchange 302 since that is how it knew Phone A. In an example embodiment, this RTP matches the pinhole for Phone A and may get changed to 1.1.1.1, 10000.

In an example embodiment, the NAT-SBC may fix up 328 the RTP packet header, changing the destination to 10.1.1.1, 10001 and the source to 20.1.1.10, 20000, match the information saved when the outside source entry was created 221 as discussed above.

In an example embodiment, the NAT-SBC forwards 330 the RTP packet to the PAT 1. The destination address and port should match the entry in the PAT 1 look up table and the PAT 1 may fix up the packet 332 accordingly and forward the fixed up packet 334 to Phone A.

In an example embodiment, a NAT-SBC may detect whether a third-party device, for example a router, from which it receives a communication from a UA is a NAT device or symmetric PAT device or a non-symmetric PAT device. The NAT-SBC may then perform operations in accordance with the logic as set out in this disclosure in the event that the received communication is from a non-symmetric PAT device.

Figure 4:
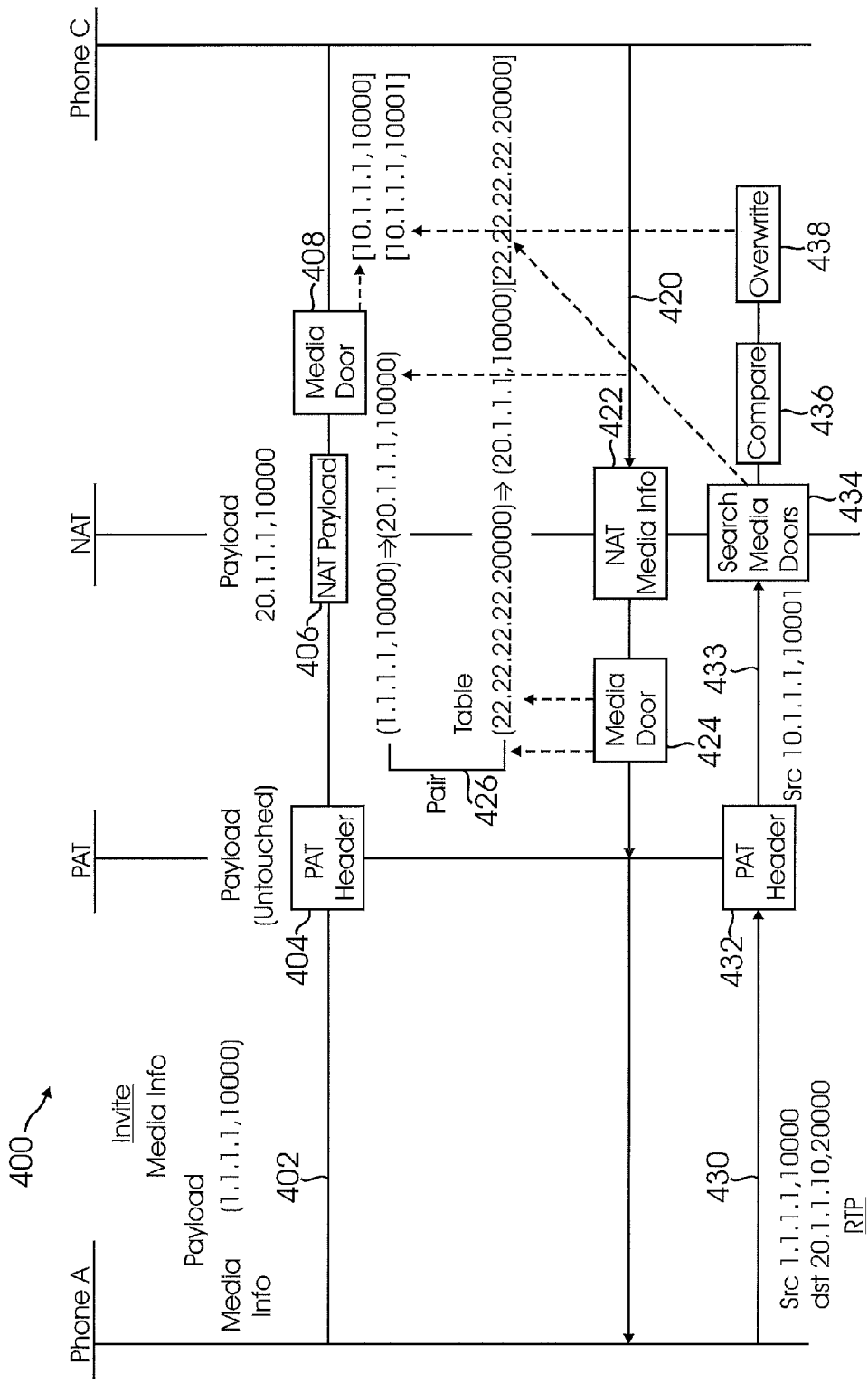
FIG. 4 illustrates an example embodiment of a method of communicating between two user agents.

FIG. 4 illustrates an example method 400 of exchanging media between an inside user agent, for example a Phone A, and an outside user agent, for example Phone C. Phone A may send an INVITE message 402 to Phone C. The invite message may carry the Phone A's media-information in an embedded-SDP, for example (1.1.1.1, 10000). The embedded payload may not be touched by the PAT, so that (1.1.1.1, 10000) appears as is to the NAT-SBC. The NAT-SBC may NAT the media information 406, for example to (20.1.1.1, 10000). The header-IP may have been modified by the PAT 404, for example to (10.1.1.1). The NAT-SBC may keep the media-door association 408 for this call-id as follows:

(1.1.1.1, 10000)→(20.1.1.1, 10000) [10.1.1.1, 10000].

In an example embodiment, the outside user agent (Phone C) may send a "200 OK" message 420. The OK message may carry with it the media information for reaching Phone C, for example (22.22.22.22, 20000). The NAT-SBC may NAT this information 422, for example to (20.1.1.10, 20000). The header-IP as seen by the NAT-SBC is may have been, for example, (22.22.22.22). The NAT-SBC may keep the media-door association 424 for this as follows:

((22.22.22.22, 20000)→(20.1.1.10, 20000) [22.22.22.22, 20000]

Since call-ids are the same for both Phone A and Phone C, the NAT-SBC associates both of the media-doors 426 together as door-pairs.

In an example embodiment, Phone A now knows Phone C as (20.1.1.10, 20000) and Phone C knows Phone A as 20.1.1.1.1, 10000. When the media starts flowing 430, for example from Phone A, it will be source IP/port 1.1.1.1, 10000 and destination IP/port 20.1.1.10, 20000. The intermediate PAT may change the source 432 to (10.1.1.1, 10001) if it is a non-symmetric PAT. In the event that the intermediate router were a NAT device or a symmetric PAT, on the other hand, it might have changed the address but not the port.

When media reaches the NAT-SBC 433, if it is the first packet of the flow, then there may not be a NAT entry in the NAT-SBC for the media, so the NAT-SBC searches 434 the media-doors to see whether to apply the logic of this disclosure or not. In the embodiment of FIG. 4, for example, the media-door entry for (20.1.1.10, 20000) may have a door-pair as follows:

Call-id: (1.1.1.1, 10000)→(20.1.1.1.1, 10000) [10.1.1.1, 10000]

(22.22.22.22, 20000)→(20.1.1.10, 20000) [22.22.22.22, 20000]

The NAT-SBC may compare 436 the source IP/port of the media with the door-pairs' saved [10.1.1.1, 10000]—which is the expected media-stream information. In the event that the intermediate device is a non-symmetric PAT, the source IP/port of the media would have been changed to (10.1.1.1, 10001), so that the door-pair comparison would fail—in which case, the NAT-SBC determines that the logic described herein should be applied. If the media source IP/port is (10.1.1.1, 10000), then the door-pair search would have succeeded and the logic described herein may not need to be applied, as the intermediate device would not be a Non-ALG PAT. If the logic described herein is applied, the NAT-SBC may overwrite 438 the port stored in the media door so that the media door will remain open, despite dynamic changes in the source port provided by a non-symmetric, Non-ALG PAT.

The SBC may, in this way, dynamically monitor and update the port to ensure that the media door remains open until the communication is complete.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A device comprising:
an input port for receiving network packets that are being communicated via a computer network;
a memory;
a processor in communication with the input port and the memory, the processor being configured to:
  receive, via the input port, an outbound signaling packet sent from an inside user agent ("UA");
    wherein the outbound signaling packet comprises a header and a payload;
    wherein the header includes an outbound source Internet Protocol address-port pair ("IP-port") that identifies the inside UA;
    wherein the payload includes a call-identification ("ID") and an inside IP-port that also identifies the inside UA but differs from the outbound source IP-port;
  store, in the memory, an inside-source entry comprising the call-ID, the inside IP-port, an inside contact IP-port, and the outbound source IP-port, the outbound source IP-port representing a pinhole;
  translate the outbound source IP-port in the header into an internal proxy IP-port;
  translate the inside IP-port in the payload into the inside contact IP-port;
  transmit, via the output port, the outbound signaling packet;
  receive, via the input port, an inbound signaling packet sent to the inside UA;
    wherein the inbound signaling packet includes a header and a payload;
    wherein the header of the inbound signaling packet comprises an inbound destination IP-port;
    wherein the payload of the inbound signaling packet comprises a call-ID and an outside IP-port;
  store, in the memory, an outside-source entry comprising the call-ID of the inbound signaling packet, the outside IP-port, and an outside contact IP-port;
  translate the outside IP-port in the payload of the inbound signal into the outside contact IP-port;
  translate the inbound destination IP-port in the header of the inbound signal into the inside IP-port of the inside-source entry if the inbound destination IP-port matches the inside contact IP-port of the inside-source entry;
  overwrite the inbound destination IP-port with the pinhole if the pinhole was stored in the inside-source entry;
  transmit, via an output port, the inbound signaling packet;
  receive, via the input port, an outbound media packet sent from the inside UA, wherein the outbound media packet includes an outbound media source IP-port and an outbound media destination IP-port, and wherein the outbound media packet comprises a real-time transport protocol ("RTP") data;
  overwrite the pinhole of the inside-source entry with the outbound media source IP-port if the outbound media destination IP-port matches the outside contact IP-port of the outside-source entry and if the call-ID of the outside-source entry matches the call-ID of the inside-source entry;
  translate the outbound media destination IP-port into the outside IP-port of the outside-source entry; and
  transmit, via the output port, the outbound media packet; and
the output port in communication with the processor for transmitting packets via the computer network.

2. The device of claim 1, wherein the processor is further configured to:
receive, via the input port, an inbound media packet sent to the inside UA, wherein the inbound media packet includes an inbound media destination IP-port;
translate the inbound media destination IP-port of the inbound media packet into the pinhole of the inside-source entry if the inbound media destination IP-port matches the inside contact IP-port of the inside-source entry; and
transmit, via the output port, the outbound media packet.

3. The device of claim 2, wherein the inbound media packet further includes an inbound media source IP-port, and wherein the processor is further configured to translate the inbound media source IP-port into the outside contact IP-port of the outside-source entry if the inbound media source IP-port matches the outside IP-port of the outside-source entry.

4. The device of claim 2, wherein the inbound media packet comprises an RTP data.

5. The device of claim 1, wherein the IP address of the internal proxy IP-port is from an address pool assigned to the device.

6. The device of claim 5, wherein the IP address of the internal proxy IP-port is same as the IP address of the inside contact IP-port.

7. The device of claim 1, wherein the header of the outbound signaling packet further includes an outbound destination IP-port, and wherein the processor is further configured to translate the outbound destination IP-port into an external proxy IP-port.

8. The device of claim 1, wherein the header of the inbound signaling packet further includes an inbound source IP-port, and wherein the processor is further configured to translate the inbound source IP-port into the outside contact IP-port.

9. The device of claim 1, wherein the processor is further configured to translate the outbound media source IP-port of the outbound media packet into the inside contact IP-port of the inside-source entry if the outbound media destination IP-port matches the outside contact IP-port of the outside-source entry and if the call-ID of the outside-source entry matches the call-ID of the inside-source entry.

10. The device of claim 1, wherein the outbound signaling packet is a session initiation protocol ("SIP") register packet, an SIP invite packet, or an SIP acknowledgement packet.

11. The device of claim 1, wherein the inbound signaling packet is an SIP invite packet or an SIP acknowledgement packet.

12. A method for session border controlling, comprising:
receiving, by a computer processor, an outbound signaling packet sent from an inside user agent ("UA");
  wherein the outbound signaling packet comprises a header and a payload;

wherein the header includes an outbound source internet protocol address-port pair ("IP-port") that identifies the inside UA;
wherein the payload includes a call-identification ("ID") and an inside IP-port that also identifies the inside UA but differs from the outbound source IP-port;
storing, in a memory in communication with the processor, an inside-source entry comprising the call-ID, the inside IP-port, an inside contact IP-port, and the outbound source IP-port, the outbound source IP-port representing a pinhole;
translating the outbound source IP-port in the header into an internal proxy IP-port;
translating the inside IP-port in the payload into the inside contact IP-port;
transmitting, by the processor, the outbound signaling packet;
receiving, by the processor, an inbound signaling packet sent to the inside UA;
wherein the inbound signaling packet includes a header and a payload;
wherein the header of the inbound signaling packet comprises an inbound destination IP-port;
wherein the payload of the inbound signaling packet comprises a call-ID and an outside IP-port;
storing, in the memory, an outside-source entry comprising the call-ID of the inbound signaling packet, the outside IP-port, and an outside contact IP-port;
translating the outside IP-port in the payload of the inbound signal into the outside contact IP-port;
translating the inbound destination IP-port in the header of the inbound signal into the inside IP-port of the inside-source entry if the inbound destination IP-port matches the inside contact IP-port of the inside-source entry;
overwriting the inbound destination IP-port with the pinhole if the pinhole was stored in the inside-source entry;
transmitting, by the processor, the inbound signaling packet;

receiving, by the processor, an outbound media packet sent from the inside UA, wherein the outbound media packet includes an outbound media source IP-port and an outbound media destination IP-port, and wherein the outbound media packet comprises a real-time transport protocol ("RTP") data;
overwriting the pinhole of the inside-source entry with the outbound media source IP-port if the outbound media destination IP-port matches the outside contact IP-port of the outside-source entry and if the call-ID of the outside-source entry matches the call-ID of the inside-source entry;
translating the outbound media destination IP-port into the outside IP-port of the outside-source entry; and
transmitting, by the processor the outbound media packet.

13. The method of claim 12, further comprising:
receiving, by the processor, an inbound media packet sent to the inside UA, wherein the inbound media packet includes an inbound media destination IP-port;
translating the inbound media destination IP-port of the inbound media packet into the pinhole of the inside-source entry if the inbound media destination IP-port matches the inside contact IP-port of the inside-source entry; and
transmitting, by the processor, the outbound media packet.

14. The method of claim 12, wherein the header of the outbound signaling packet further includes an outbound destination IP-port, and wherein the method further comprises translating the outbound destination IP-port into an external proxy IP-port.

15. The method of claim 12, wherein the header of the inbound signaling packet further includes an inbound source IP-port, and wherein the method further comprises translating the inbound source IP-port into the outside contact IP-port.

* * * * *